(12) United States Patent
Yadav et al.

(10) Patent No.: US 11,756,295 B2
(45) Date of Patent: Sep. 12, 2023

(54) STORAGE SYSTEM AND METHOD FOR EVENT-DRIVEN DATA STITCHING IN SURVEILLANCE SYSTEMS

(71) Applicant: Western Digital Technologies, Inc., San Jose, CA (US)

(72) Inventors: Akhilesh Yadav, Bengaluru (IN); Ramanathan Muthiah, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 218 days.

(21) Appl. No.: 17/178,433

(22) Filed: Feb. 18, 2021

(65) Prior Publication Data
US 2022/0171970 A1    Jun. 2, 2022

Related U.S. Application Data

(60) Provisional application No. 63/119,768, filed on Dec. 1, 2020.

(51) Int. Cl.
| | | |
|---|---|---|
| *G06T 11/60* | (2006.01) | |
| *G06V 20/40* | (2022.01) | |
| *G06T 7/292* | (2017.01) | |
| *G06T 3/40* | (2006.01) | |
| *G06F 12/02* | (2006.01) | |
| *H04N 7/18* | (2006.01) | |
| *H04N 23/66* | (2023.01) | |
| *H04N 23/667* | (2023.01) | |

(52) U.S. Cl.
CPC .......... *G06V 20/40* (2022.01); *G06F 12/0253* (2013.01); *G06T 3/4038* (2013.01); *G06T 7/292* (2017.01); *H04N 7/181* (2013.01); *H04N 23/66* (2023.01); *H04N 23/667* (2023.01); *G06T 2207/10016* (2013.01); *G06T 2207/20016* (2013.01); *G06V 20/44* (2022.01)

(58) Field of Classification Search
CPC  G06K 9/00771; G06K 9/00711; G06T 7/194; G06T 3/40; G06T 5/20; G06T 3/4053; G06T 7/292; G06T 3/4038; G06F 12/0253; H04N 5/23203; H04N 7/181
See application file for complete search history.

(56) References Cited

U.S. PATENT DOCUMENTS

| | | |
|---|---|---|
| 6,542,075 B2 | 4/2003 | Barker et al. |
| 7,764,808 B2 | 6/2010 | Zhu et al. |
| 7,760,230 B2 | 7/2010 | Russell et al. |

(Continued)

OTHER PUBLICATIONS

U.S. Appl. No. 16/818,452, filed Mar. 13, 2020, entitled "Storage System and Method for Improved Playback Analysis."

(Continued)

*Primary Examiner* — Phuoc H Doan
(74) *Attorney, Agent, or Firm* — Crowell & Moring LLP (57) ABSTRACT

A storage system and method for event-driven data stitching in surveillance systems are provided. In one embodiment, a storage system is provided comprising a memory and a controller. The controller is configured to track an object in a plurality of video streams; determine which video frames in each of the plurality of video streams contain the object; create a separate video stream from the video frames that contain the object; and store the created separate video stream in the memory. Other embodiments are provided.

20 Claims, 8 Drawing Sheets

(56) References Cited

U.S. PATENT DOCUMENTS

| | | | |
|---|---|---|---|
| 8,681,859 | B2 | 3/2014 | Washington |
| 9,204,107 | B2 | 12/2015 | Yin et al. |
| 9,489,580 | B2 | 11/2016 | Laska et al. |
| 2010/0157049 | A1 | 6/2010 | Dvir et al. |
| 2014/0347475 | A1 | 11/2014 | Divakaran et al. |
| 2020/0193166 | A1* | 6/2020 | Russo ............... G06T 7/194 |
| 2020/0228812 | A1 | 7/2020 | Muthiah |
| 2021/0104014 | A1* | 4/2021 | Kolb, V ............... G06T 5/20 |

OTHER PUBLICATIONS

"Event stream processing"; Wikipedia entry; downloaded from the Internet at https://en.wikipedia.org/wiki/Event_stream_processing on Aug. 11, 2020; 2 pages.

Alseghayer, Rakan et al.; "Detection of Highly Correlated Live Data Streams"; BIRTE '17, Munich, Germany; Aug. 28, 2017; 8 pages.

International Search Report dated Aug. 31, 2021 for International Application No. PCT/US2021/034250.

Written Opinion dated Aug. 31, 2021 for International Application No. PCT/US2021/034250.

Search Strategy completed Aug. 31, 2021 for International Application No. PCT/US2021/034250.

\* cited by examiner

STORAGE SYSTEM AND METHOD FOR EVENT-DRIVEN DATA STITCHING IN SURVEILLANCE SYSTEMS

CROSS-REFERENCE TO RELATED APPLICATION

This application claims the benefit of U.S. provisional patent application No. 63/119,768, filed Dec. 1, 2020, which is hereby incorporated by reference.

BACKGROUND

A storage system can be used to store data streams generated by a surveillance system. In operation, a plurality of video capture devices (e.g., cameras) record video from different (sometimes, non-overlapping) vantage points in a location. The video streams from each of the video capture devices are provided to a host, which stores them in a memory of the storage system. The stored video streams can later be retrieved from the storage system for review.

DETAILED DESCRIPTION

Overview

By way of introduction, the below embodiments relate to a storage system and method for event-driven data stitching in surveillance systems. In one embodiment, a storage system is provided comprising a memory and a controller. The controller is configured to track an object in a plurality of video streams; determine which video frames in each of the plurality of video streams contain the object; create a separate video stream from the video frames that contain the object; and store the created separate video stream in the memory.

In other embodiments, the controller is further configured to, prior to tracking the object, identify the object in one of the plurality of video streams.

In other embodiments, the controller is further configured to: determine a correlation index of the object in each of the plurality of video streams; and create the separate video stream in response to the correlation index being greater than a threshold.

In other embodiments, the controller is further configured to create the separate video stream by arranging the video frames that contain the object in a time-capture order.

In other embodiments, the controller is further configured to store the plurality of video streams in the memory.

In other embodiments, the controller is further configured to increase capture resolution of the video frames that contain the object.

In other embodiments, the controller is further configured to perform garbage collection prior to storing the created separate video stream in the memory.

In other embodiments, the controller is further configured to receive the plurality of video streams from a host in communication with a plurality of video capture devices.

In other embodiments, the controller is further configured to: receive, from a playback device, a vendor-specific command to access the created separate video stream stored in the memory; and in response to receiving the vendor-specific command, provide the created separate video stream to the playback device.

In other embodiments, the plurality of video streams comprise live video streams.

In other embodiments, the memory comprises a three-dimensional memory.

In another embodiment, a method is provided that is performed in a storage system comprising a memory. The method comprises receiving a plurality of video streams; filtering the plurality of video streams to identify a plurality of video frames that contain an object; merging the plurality of video frames into a video file; and storing the video file in the memory.

In other embodiments, the plurality of video streams are filtered based on a correlation value.

In other embodiments, the method further comprises increasing capture resolution of the video frames that contain the object.

In other embodiments, the method further comprises performing garbage collection prior to storing the video file in the memory.

In other embodiments, the method further comprises receiving, from a playback device, a vendor-specific command to access the video file; and in response to receiving the vendor-specific command, providing the video file to the playback device.

In other embodiments, the plurality of video streams are received from a host in communication with a plurality of video capture devices.

In other embodiments, the plurality of video streams comprise live video streams.

In other embodiments, the plurality of video streams are merged by arranging the video frames that contain the object in a time-capture order.

In another embodiment, a storage system is provided comprising: a memory; means for stitching together related events from a plurality of video streams into a separate video stream; and means for storing the separate video stream in the memory.

Other embodiments are possible, and each of the embodiments can be used alone or together in combination. Accordingly, various embodiments will now be described with reference to the attached drawings.

Embodiments

Figures 1A, 1B:
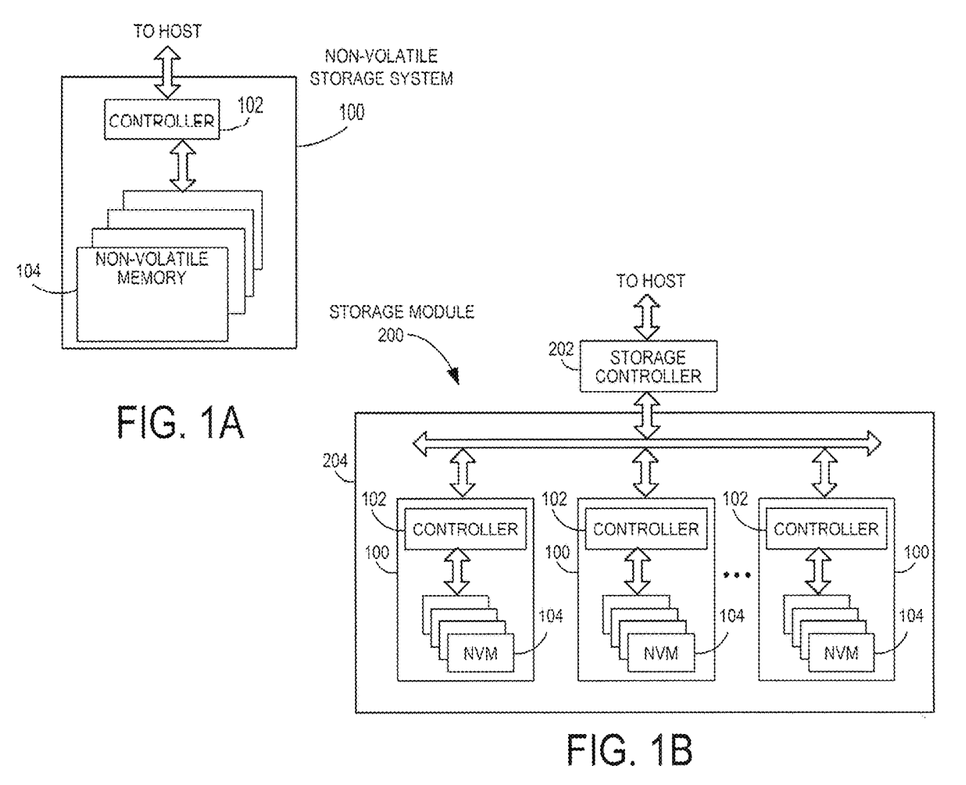
FIG. 1A is a block diagram of a non-volatile storage system of an embodiment.
FIG. 1B is a block diagram illustrating a storage module of an embodiment.
Figure 1C:
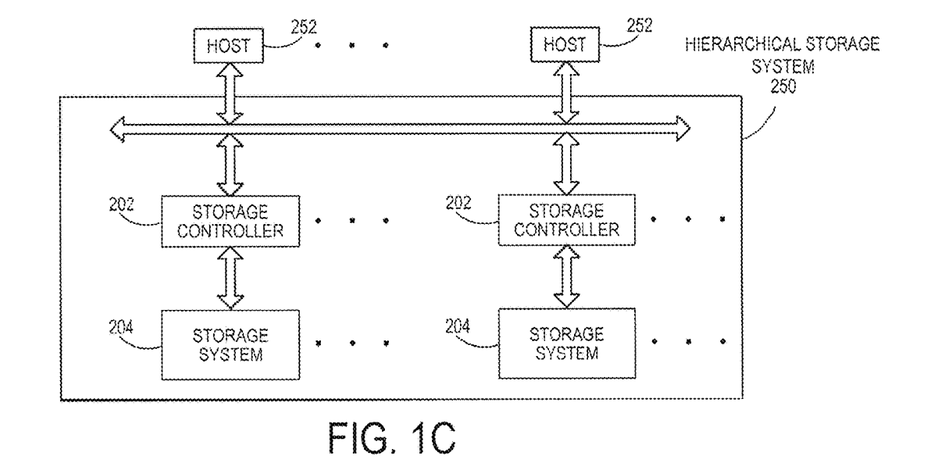
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
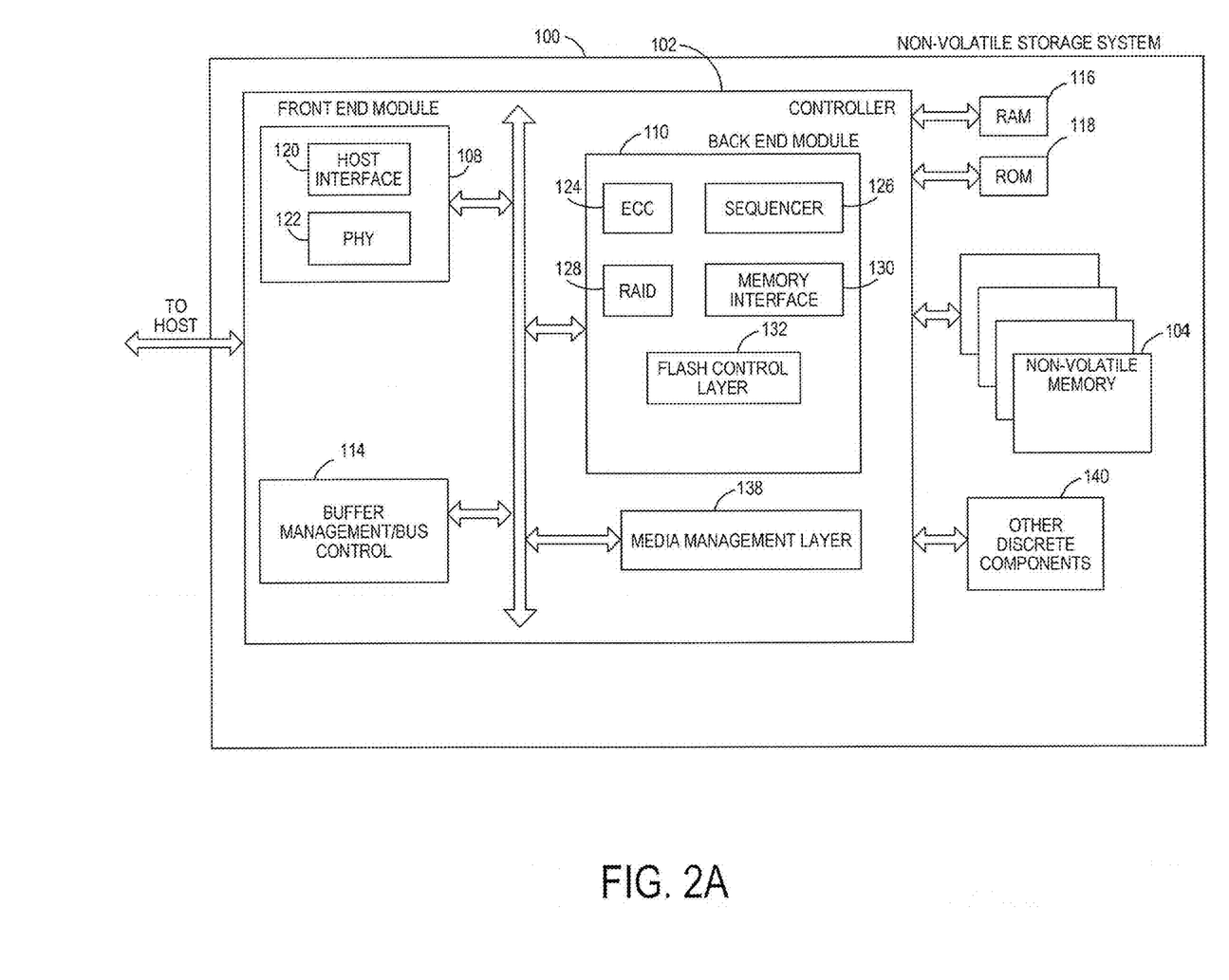
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
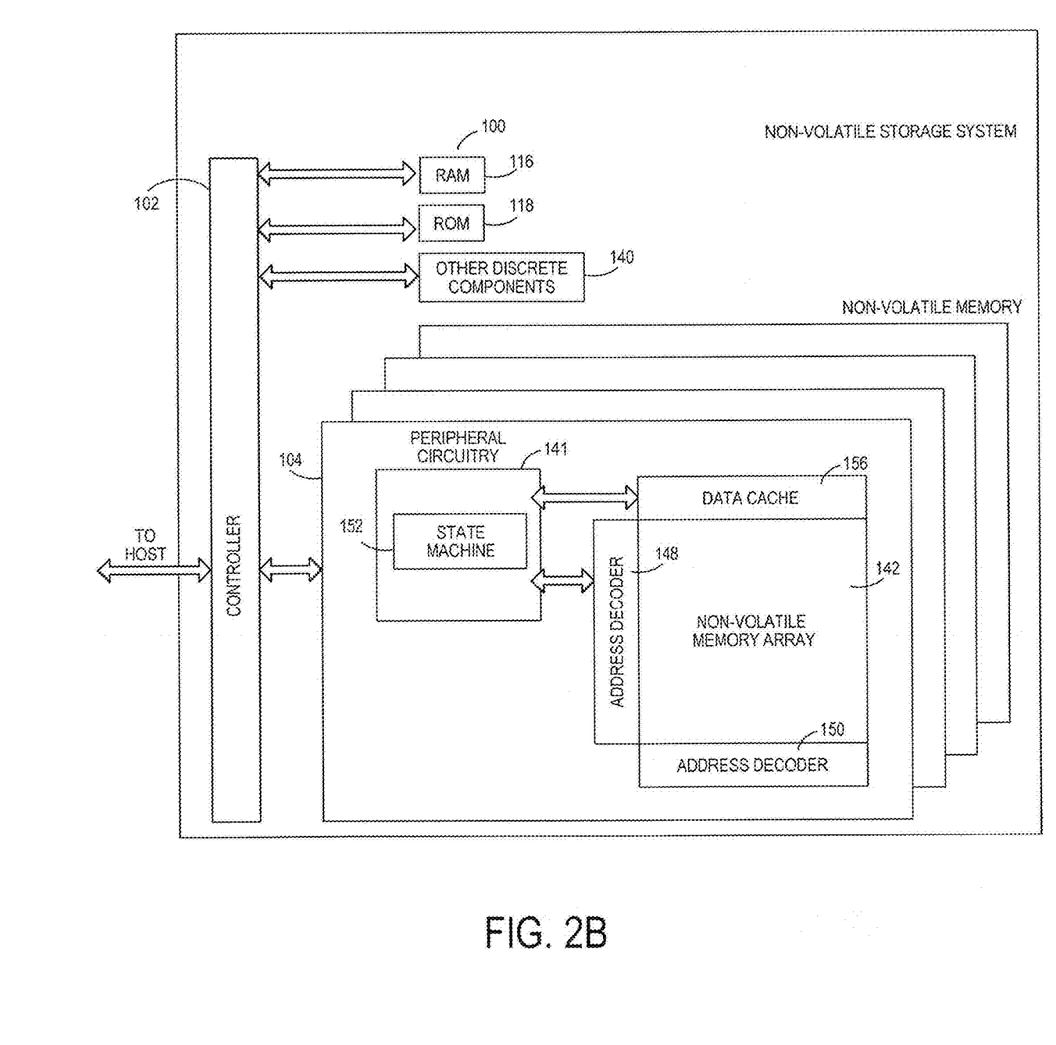
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
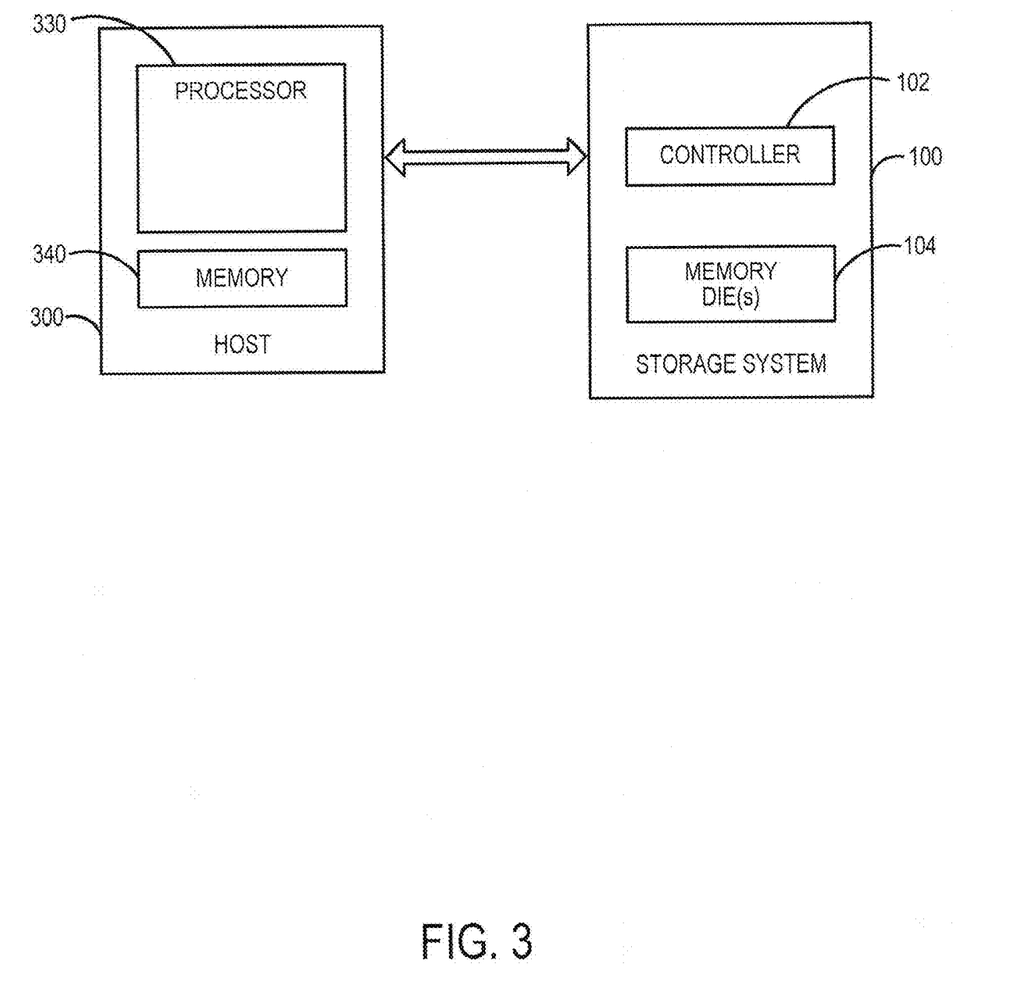
FIG. 3 is a block diagram of a host and storage system of an embodiment.

Turning again to the drawings, FIG. 3 is a block diagram of a host 300 and storage system 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300.

Figure 4:
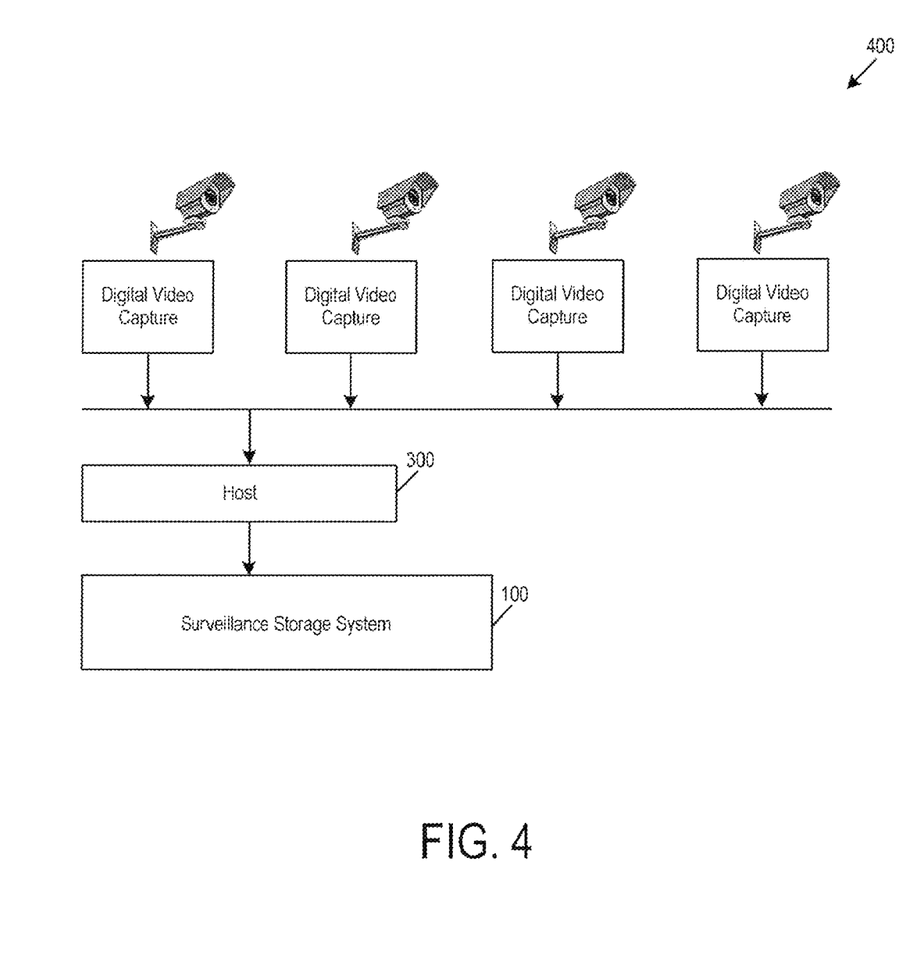
FIG. 4 is a block diagram of a digital video surveillance system of an embodiment.

With reference to FIG. 4, in one embodiment, a digital video surveillance system 400 is presented in which the host 300 manages data captured from one or more video capture devices (e.g., digital video cameras) connected over a network and stores the data in the storage system 100 (which is sometimes referred to herein as the surveillance storage system or device). In one embodiment, each camera is in a fixed position (i.e., static) with a limited view vicinity. Multiple cameras can be used to monitor a large space from several (overlapping or non-overlapping) viewpoints. Each camera provides its own video stream to the host 300, and the host 300 can synchronize the live camera streams and help track an event or a person in a live stream or store the stream triggered on these events.

In operation, the host 300 captures the live video streams from the cameras, which may or may not be triggered by an event, and encodes all the streams into a single or multiple streams based on the host's configuration. The host 300 stores multiplexed video stream in the storage system 100. Each of the cameras has its own stream, and once the data is stored into the storage system 100, it can be viewed by a user by separating each stream/channel data (e.g., based on the camera identifier (ID) or streams). In the real world, most of the events happen in a scattered space (i.e., spread across many camera streams), which will be stored as-is into the storage system 100. This creates a challenging task for the user to view all the streams from all the cameras and figure out the sequence of events. That is, because the video streams from multiple data streams are multiplexed into a single stream and there is no data integration done on the streams (e.g., based on the events), event analysis can be a very difficult and time-consuming task for the user.

Figure 5:
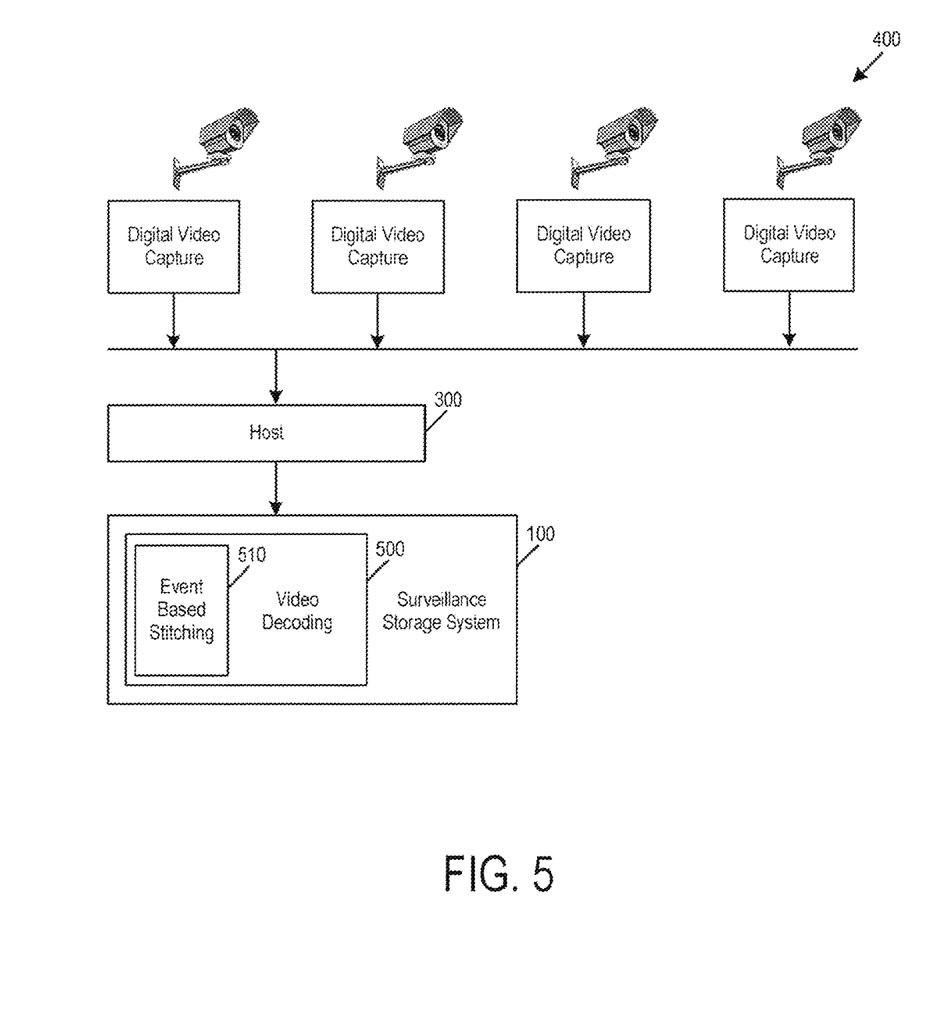
FIG. 5 is a block diagram of a digital video surveillance system of an embodiment in which a storage system comprises a video decoder with an event-based stitching module.

To address this problem, in one embodiment, the storage system 100 stitches data from various capture points whenever a correlation index crosses a threshold in one or more captured images to make sure all the captured images are relevant to an event. This detection and further triggering of stitching of events from various streams into one stream are driven by the storage system 100 not by the host 100 or a specific object type. As shown in FIG. 5, in one embodiment, the storage system 100 is configured with a video decoder 500 that has an event-based stitching module 510 that is configured to stitch the video (data stream) of related live events into a separate video stream (data file). (The decoder 500 and module 510 can be implemented, for example, as a hardware accelerators/firmware in the controller 102 to detect correlation between the streams.) In this way, one event can be viewed as a single stream, even though it is spread across multiple cameras. There can be many events going on in parallel, and, based on their correlation coefficients, a software-based mechanism can be used to filter-out correlated data streams and stitch them together in a single independent stream. This single stream can be used later to generate an event-specific video/data file in the storage system 100.

In operation, the storage system 100 receives a plurality of video streams (here, live video streams) from the host 300 from each of the plurality of cameras. The controller 102 (e.g., the event-based stitching module 510 in the video decoder 500) identifies an object/event (e.g., a person, a car, etc.) in one of the video streams and tracks that object as it moves across the video streams. For example, if the object is a car moving across an area under surveillance, the car would be captured by various ones of the cameras as the car is moving across the area. The controller 102 in the storage system 100 would track the car's movement by determining which video frames in each of the plurality of video streams contain the object. The controller 102 would then create a separate video stream from the video frames that contain the object and store the created separate video stream in the memory 104. That is, the controller 102 filters the plurality of video streams to identify a plurality of video frames that contain an object and merges those plurality of video frames into a video file that is stored in the memory 104. That way, when a playback device (e.g., the host 300 or another device) wants to review the footage for the object, the playback device can simply request (e.g., using a vendor-specific command) the curated video file to see only the relevant video frames that captured the object. This can save the user a great deal of time, as only the relevant video frames are presented.

An object can be tracked in the plurality of video streams in any suitable way. For example, in one embodiment, the controller 102 determines a correlation index of the object in each of the plurality of video streams and creates the separate video stream in response to the correlation index being greater than a threshold. This embodiment will be discussed in more detail in conjunction with FIGS. 6A, 6B, and 7.

Figure 6A:
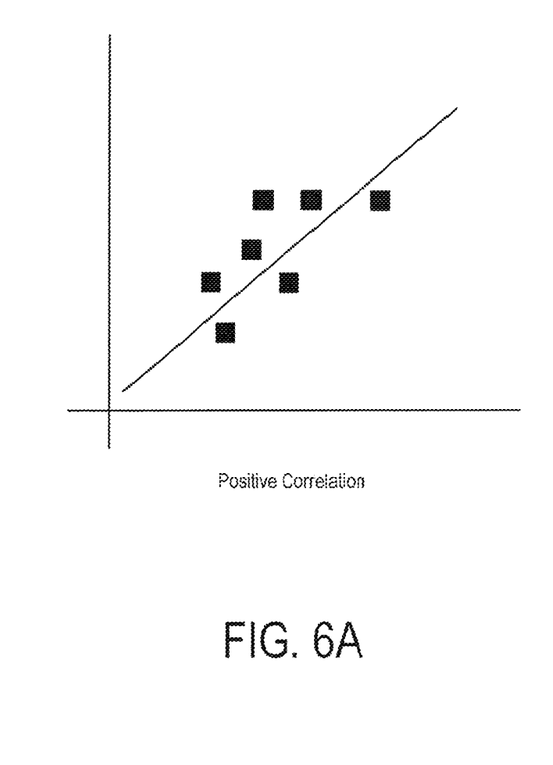
FIG. 6A is a graph illustrating a positive correlation in an object tracking method of an embodiment.
Figure 6B:
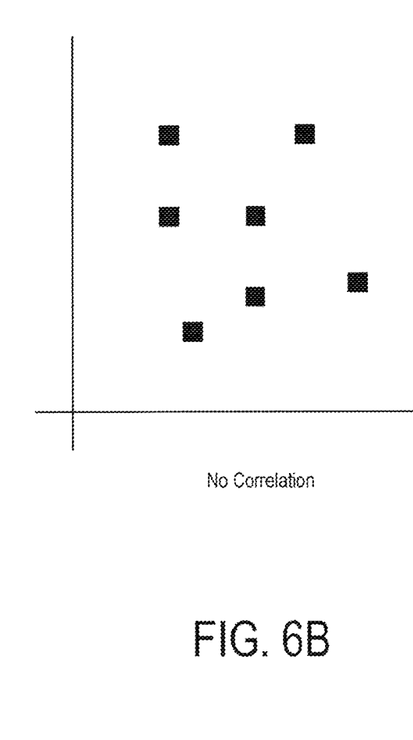
FIG. 6B is a graph illustrating no correlation in an object tracking method of an embodiment.
Figure 7:
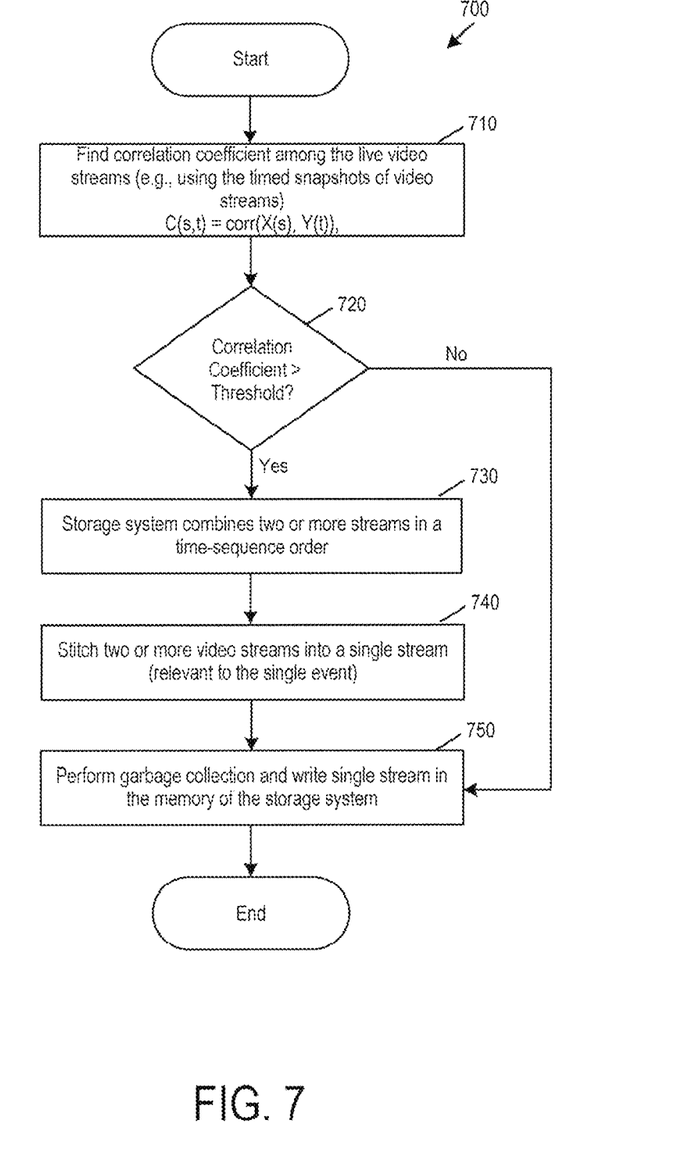
FIG. 7 is a flow chart of a method for event-driven data stitching in a surveillance system of an embodiment.

FIG. 7 is a flow chart 700 of a method of an embodiment for event-driven data stitching. As shown in FIG. 7, in this embodiment, the controller 102 of the storage system 100 finds a correlation coefficient for an object among the live video streams (act 720). Using simple correction logic, streams from the multiple cameras are passed through the stitching logic, and the correlation coefficient is generated, which results in the stitched live stream. This correlation can involve a partial or full decode of some video frames by the video decoder 500. The controller 102 then determines if the correlation coefficient is above a threshold (act 730). FIG. 6A is a graph illustrating a positive correlation (where the correlation coefficient is above the threshold), and FIG. 6B is a graph illustrating no correlation (where the correlation coefficient is not above the threshold).

If the correlation coefficient is not above the threshold, the controller 102 stores the video streams in the memory 104 (act 750). However, if the correlation coefficient is above the threshold, the controller 102 combines two or more streams in a time-sequence (time-capture) order of events, so the video frames in the combined stream are in the proper time order (act 730). Then, the controller 102 stitches the streams into a single stream/video file, with the result being only those video frames that are relevant to the object/event being tracked (act 740). Then, the controller 102 stores the file in the memory 104, optionally, after first performing garbage collection on the memory 104 (act 750). In addition to just storing the curated video file, the controller 102 can also store the "raw" underlying plurality of video streams in the memory 104.

So, the surveillance host 300 at the time of recording the live video streams from various directional cameras can provide input to a hardware/firmware-based mechanism in the storage system 100 to detect the correlation percentage between the streams. Once the detection of the correlation coefficient crosses a predefined threshold, the input streams are merged into a single steam.

There are many alternatives that can be used. For example, in one embodiment, the controller 102 is further configured to increase capture resolution of the video frames that contain the object (i.e., by sending an instruction to the video camera to use increased (image/video) resolution when creating future videos). This can help in the later review of the footage. For example, if the object of interest is a car, increasing the resolution can help a user read the license plate of the car. Further, on determining an event based on a threshold, the controller 102 of the storage system 100 can exchange the captured data (image/object) to other streams in the same or different storage system (capture points) over a network. On identifying a similar object in other streams (in the same or different storage system), the controller 102 can trigger better capture resolution internally based on correlation within a time frame. A master storage system can combine multiple such captures of the same object from one or multiple devices (locations) to form a new file stream based on the event. The frames related to the events are segregated and further arranged based on the time of their capture in the master device. This new stream is in addition to typically-stored data in multiple devices. The storage system 100 can stitch the data from various capture points whenever a correlation index crosses a threshold in one or more capture images to make sure all the captures are relevant to the event. One of the storage systems can maintain the event-based stitched data in addition to the typically-captured data. Stitched data can be kept in a more-accessible flash memory.

The following is an example that illustrates the advantages associated with these embodiments. In this example, an event occurs in a public place and involves a fast-moving car. This event and many other events are recorded into a surveillance system. Due the physical/vicinity limitation of high resolution, this event will be recorded by multiple cameras, and each stream will be stored in a separate file or video channel (i.e., not stitched based on the event). So, to review or analyze the event, all the files or channels would need to be viewed simultaneously. However, with the embodiments presented herein, at the time of capturing the events (in this example, in the live video stream), based on the correlation between the streams of the event (e.g., car type/color/license plate), a single stream can be created that will cover the event in time sequence. As can be seen from this example, the use of this embodiment can allow faster analysis on an event captured with a complex array of multiple cameras by optimizing storage and integrating live video streams scattered among many cameras of an event. This provides a cost-effective solution for a surveillance system to access independent streams.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
    a memory; and
    a controller configured to:
        track an object in a plurality of video streams by determining a correlation value of the object in each video stream of the plurality of video streams; and
        in response to the correlation value exceeding a threshold:
            determine which video frames in each video stream of the plurality of video streams contain the object;
            create a separate video stream using the video frames that contain the object; and
            store the created separate video stream in the memory.

2. The storage system of claim 1, wherein the controller is further configured to, prior to tracking the object, identify the object in one video stream of the plurality of video streams.

3. The storage system of claim 1, wherein the controller is further configured to create the separate video stream by arranging the video frames that contain the object in a time-capture order.

4. The storage system of claim 1, wherein the controller is further configured to store the plurality of video streams in the memory.

5. The storage system of claim 1, wherein the controller is further configured to command a video camera to increase resolution of future video frames that contain the object.

6. The storage system of claim 1, wherein the controller is further configured to perform garbage collection prior to storing the created separate video stream in the memory.

7. The storage system of claim 1, wherein the controller is further configured to receive the plurality of video streams from a host in communication with a plurality of video capture devices.

8. The storage system of claim 1, wherein the controller is further configured to:
    receive, from a playback device, a vendor-specific command to access the created separate video stream stored in the memory; and
    in response to receiving the vendor-specific command, provide the created separate video stream to the playback device.

9. The storage system of claim 1, wherein the plurality of video streams comprises live video streams.

10. The storage system of claim 1, wherein the memory comprises a three-dimensional memory.

11. A method comprising:
    performing the following in a storage system comprising a memory:
        tracking an object in a plurality of video streams by determining a correlation value of the object in each video stream of the plurality of video streams; and
        in response to the correlation value exceeding a threshold:
            determining which video frames in each video stream of the plurality of video streams contain the object;
            creating a separate video stream using the video frames that contain the object; and
            storing the created separate video stream in the memory.

12. The method of claim 11, further comprising prior to tracking the object, identifying the object in one video stream of the plurality of video streams.

13. The method of claim 11, wherein creating the separate video stream comprises arranging the video frames that contain the object in a time-capture order.

14. The method of claim 11, further comprising storing the plurality of video streams in the memory.

15. The method of claim 11, further comprising commanding a video camera to increase resolution of future video frames that contain the object.

16. The method of claim 11, further comprising performing garbage collection prior to storing the created separate video stream in the memory.

17. The method of claim 11, further comprising receiving the plurality of video streams from a host in communication with a plurality of video capture devices.

18. The method of claim 11, further comprising:
    receiving, from a playback device, a vendor-specific command to access the created separate video stream stored in the memory; and
    in response to receiving the vendor-specific command, providing the created separate video stream to the playback device.

19. The method of claim 11, wherein the plurality of video streams comprises live video streams.

20. A storage system comprising:
    a memory;
    means for tracking an object in a plurality of video streams by determining a correlation value of the object in each video stream of the plurality of video streams;
    means for determining which video frames in each video stream of the plurality of video streams contain the object in response to the correlation value exceeding a threshold;
    means for creating a separate video stream using the video frames that contain the object; and
    means for storing the created separate video stream in the memory.

* * * * *